Oct. 24, 1972

MASAO MATSUI 3,700,544

COMPOSITE SHEATH-CORE FILAMENTS HAVING
IMPROVED FLEXURAL RIGIDITY

Filed July 29, 1965

Oct. 24, 1972  MASAO MATSUI  3,700,544
COMPOSITE SHEATH-CORE FILAMENTS HAVING
IMPROVED FLEXURAL RIGIDITY
Filed July 29, 1965  2 Sheets-Sheet 2 though the Young's modulus of

United States Patent Office 3,700,544
Patented Oct. 24, 1972

3,700,544
COMPOSITE SHEATH-CORE FILAMENTS HAVING IMPROVED FLEXURAL RIGIDITY
Masao Matsui, Osaka-fu, Japan, assignor to Kanegafuchi Boseki Kaisha, Tokyo, Japan
Filed July 29, 1965, Ser. No. 475,667
Int. Cl. D02g 3/36
U.S. Cl. 161—175
7 Claims

ABSTRACT OF THE DISCLOSURE

A composite filament of synthetic fiber-forming high polymer is melt-spun having two different components arranged in a sheath-core relationship and exhibiting improved flexural rigidity due to an appropriate non-circular shape given to the cross-section of the core. The sheath component has a better dyeability than the core component.

---

The present invention relates to composite filaments of synthetic fiber-forming high polymer and to methods for producing such filaments. More particularly, the invention relates to composite filaments which include two different components arranged in a sheath-core relationship and having improved flexural rigidity due to an appropriate non-circular shape given to the cross-section of the core.

The flexural rigidity or bending resistance of filaments is a property that is of great importance in the evaluation of the feasibility of filaments for practical use. When external forces are exerted upon knitted or woven fabrics they act in most cases to bend the filaments that compose the fabrics. In view of the fact, however, that the bending property of filaments is more difficult to be measured as compared with the tensile property, the former property has been apt to be disregarded.

One of the purposes of providing two-component filaments is to obtain two different properties of the two components in one filament. It is preferred, therefore, that the two components to be paired have different natures instead of similar natures. For example, it is possible to obtain filaments of a novel property by grouping components having different dyeability and different elasticity. It is often found, however, in many high molecular substances that dyeability and the modulus of elasticity are incompatible.

More specifically, filaments with excellent dyeability have a poor modulus of elasticity. On the other hand, those which show a high modulus of elasticity are of a poor dyeability. This conflict is attributable to the fact that fibers having greater crystallinity or hydrophobicity show a higher modulus of elasticity but have poor dyeability.

Accordingly, in grouping two components in a sheath-core relationship, if one of the components which has a poor dyeability is used as the core and the other component which has an excellent dyeability is used as the sheath, the modulus of elasticity of the sheath component will be lower than that of the inner or the core component in most cases. This is not necessarily a desirable thing from the viewpoint of the bending property of the filaments. In other words, the flexural rigidity of the filaments is expressed in terms of the product of Young's modulus and the moment of inertia of the cross-section of the filaments taken about an axis passing through the center of gravity of the cross-section.

Figure 1:
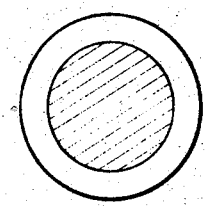

Now, if the area ratio between the sheath and the core is 1:1 in a concentric two-component filament having a circular cross-section as shown in FIG. 1 and if the moment of inertia of the overall cross-section of the filament is 1, then the moment of inertia of the cross-section of the core will be 0.25 and that of the sheath will be 0.75. Therefore, when the Young's modulus of the sheath is 1, the entire flexural rigidity of the filament will, even when the core is formed of a polymer with Young's modulus of 2, become only 1.25 times $(1\times0.75+2\times0.25)$ as against that of a single-component filament whose overall modulus of elasticity is 1.

However, in the case where the modulus of elasticity of the outer component or the sheath is 2 and that of the core is 1, the entire flexural rigidity of the filament is 1.75 times $(2\times0.75+1\times0.25)$ as great as that of a single-component filament whose overall modulus of elasticity is 1. In order to obtain resilient filaments having a great flexural rigidity, therefore, it is preferred to use a polymer with a high modulus of elasticity for the outer component. In view of the fact, however, that a polymer of a high modulus of elasticity shows a poor dyeability, it is very often undesirable to use such polymer for the sheath.

The present invention, by taking these points into consideration, contemplates providing a novel arrangement of the two components to obtain an effect to increase the flexural rigidity of filaments even when the core is made of a component with a high modulus of elasticity. More specifically, if the inner component is of a circular cross-section, it will not contribute much to the enhancement of the overall flexural rigidity of the filament. According to the present invention, the amount of contribution of the core to the overall flexural rigidity of the filament is enhanced by giving the core a shape other than circular and more particularly—a shape which has a great moment of inertia.

The present invention, therefore, as illustrated in FIGS. 3–22, is characterized in that the cross-section of the core is an appropriate irregular non-circular shape so that the moment of inertia of the said cross-section relative to various axes which pass through the center of gravity in the cross-section may be not less than 0.8 times that of a circular section of equal area while their arithmetic mean may exceed 1.2 times that of said circular section.

The various axes referred to above are the mutually perpendicular axes of a first set and the three axes separated by 120° of a second set. The arithmetic mean referred to above denotes the arithmetic mean of the moment of inertia about the axes of each respective set.

Figure 2:
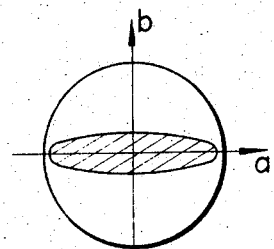

If the moment of inertia about a single axis is to be increased, the shape of the cross-section of the core would only have to be made as a flat-shaped one as shown in FIG. 2. However, such shape would result in a severe drop in the moment of inertia about the other axes, making the filament an undesirable one. It is therefore desirable that filaments have a large moment of inertia with respect to at least two axes intersecting perpendicularly. It is necessary that the ratio of the moment of inertia with respect to respective axes be at least 0.8 that of an equal circle and that the arithmetic mean ratio relative to said circle be at least 1.2. In short, it is desired that the configuration of a cross-section of the core be basically of an approximately symmetrical form.

Figure 3:
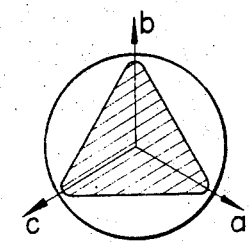

It is also essential that the shape of a cross-section of the core be unitary, i.e. one piece and not disconnected. A configuration consisting of more than two separated portions will show a large value of quadratic moment when computed, but it requires a condition that the distance between respective sections be identical. Thus, such configuration is not contributory for the achievement of the objects of the present invention. FIG. 3 shows an example of the configuration where the cross-sectional area of the core is equal to that of the sheath and the cross-sectional shape of the core presents substantially a regular triangle. When the core was given regular triangle configuration in the experiments, the amount of contribution of said core to the overall bending moment of the filament was considerably enhanced as compared with a circular configuration and was effective for the achievement of the objects of the present invention. When a less irregular shape, for example, a square configuration was used, however, hardly any effect was observed. This is because, in the case of regular triangle configuration, the flexural rigidity or the moment of inertia about an axis passing through the center of gravity and a vertex amounted to approximately 1.21 as compared to a circle, but in the case of a square or other regular polygon, the ratio of moment of intertia was almost 1.

Figure 4:
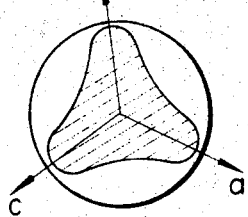
Figure 5:
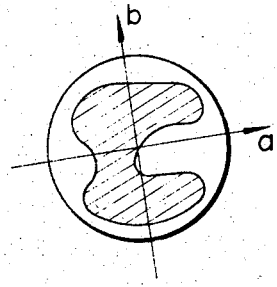
Figure 6:
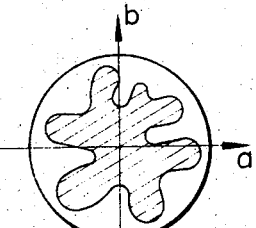
Figure 7:
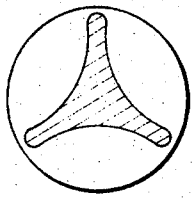
Figure 8:
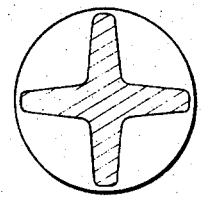
Figure 13:
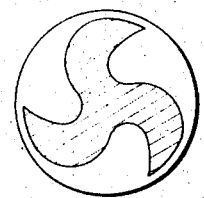
Figure 14:
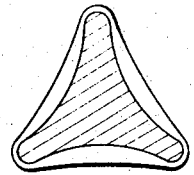
Figure 15:
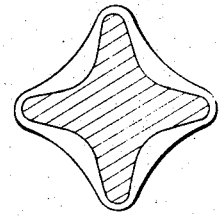

The configuration of the cross-section of the sheath component need not be circular. FIGS. 14 and 15 show examples where the configuration of the sheath is not circular. Such filaments have unique luster and bending property. The core need not have a strictly symmetrical cross-sectional shape; it may have an irregular shape such as is shown in FIG. 4, FIG. 5 and FIG. 6. In these figures, straight lines $a$, $b$ and $c$ indicate examples of axes for use in computing moment of inertia. The center of gravity of the cross-section of the core may deviate from the center of gravity of the overall cross-section of the filament. When the center of gravity of the core deviates, the filament will display three-dimensional crimps or curls by an appropriate shrink treatment after drawing. Even when the filament undergoes a crimping process, improvement of the bending property which is an object of the present invention is not hampered, but instead, the feature of the present invention will be further enhanced as shown in Example 4 of the present invention. The cross-section of the core may have such a configuration of symmetry of rotation as shown in FIG. 13. In case the area of the cross-section of the core is small, it is desirable that the thickness of the protrusions be reduced as shown in FIG. 7 and FIG. 8 because, by this arrangement, the moment of inertia will be enhanced. In order to further increase the moment of inertia, it will be effective if the area of portions which are located farther from the center of gravity is enlarged, but in such case, a consideration has to be given so that the thickness of the central portion will not become too small.

Polymers having a large modulus of elasticity suitable for the core include, for example, aromatic polyesters such as polyethylene terephthalate; aromatic polycarbonates; vinyl chloride; polyvinyl alcohol; polystyrene; aromatic polyamides such as polydodecamethylene terephthalamide and polyparaxylylene sebacamide; polyurea; and polyurethane.

Polymers with an excellent dyeability suitable for the sheath include polyamides such as nylon 66, nylon 6 and nylon 7; various copolymers, of polyamide; copolymers of polyester; and vinyl copolymers.

Any arbitrary combination of the said polymers or other polymers can attain the objects of the present invention so long as such combination satisfies the condition that Young's modulus of the core is greater than that of the sheath.

Figure 16:
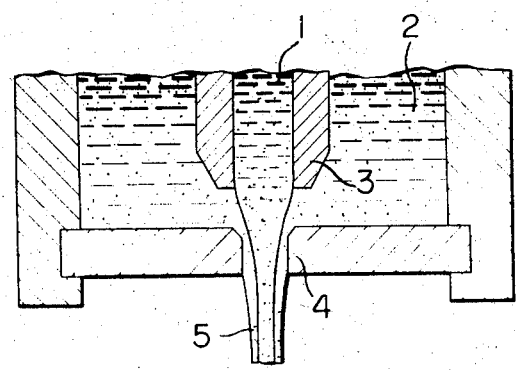

Conventional spinnerets cannot spin such two-component filaments as provided by the present invention. The invention provides for novel type spinnerets as will be hereinafter described for spinning such two component filaments. FIGS. 16 through 19 show the cross-sections of the nozzles employed in the spinnerets of the present invention. The spinneret for producing the composite filaments of the present invention is of a structure consisting, essentially, of two openings of nozzles combined together. Hereinafter, the nozzle to be used for the spinning of the core will be referred to as the inner nozzle, and the nozzle for spinning the sheath as the outer nozzle. In FIG. 16, numeral 1 denotes a polymer for the core numeral 2, a polymer for the sheath; numeral 3 the inner nozzle; numeral 4 the outer nozzle; and numeral 5 a filament which has been spinned. The nozzles of the present invention are characterized in that the opening of the inner nozzle 3 is given an appropriate irregular cross-sectional configuration which can satisfy the conditions identical with the conditions required of the configuration of the core of said two-component filament, and also in that the radius of the opening of the outer nozzle 4 is on an average more than 25% of the radius of the opening of the inner nozzle 3. The term "radius of the opening of the inner nozzle" means the lengths of the straight lines between the center of gravity of the cross-section and the outermost ends of respective protrusions, while the radius of the opening of the outer nozzle, when the cross-sections of the openings of both nozzles are placed one upon the other, means the distance between the center of gravity of the opening of the outer nozzle and the circumference of the cross-section of the opening of the outer nozzle intersected by the straight line connecting the center of gravity of the opening of the inner nozzle and the apex of the protrusion i.e. the extension of the said line. Thus, the arithmetic mean is obtained from respective ratios between the radii based on the figures computed with respect to respective protrusions of the opening of the inner nozzle.

Figure 17:
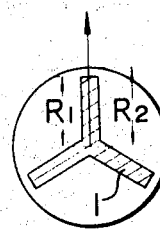
Figure 18:
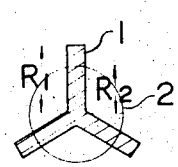
Figure 19:
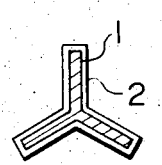

FIGS. 17 through FIG. 19 are plan views of respective projections of the outer nozzle and the inner nozzle placed one upon the other. For example, in FIG. 17 and FIG. 18, $R_1$ denotes the radius of the opening of the inner nozzle, and $R_2$ the radius of the opening of the mating outer nozzle. As shown in FIG. 16, in the spinneret of the present invention, the opening 3 of the inner nozzle is located ahead of the opening 4 of the mating outer nozzle. It is to be noted that the openings of both nozzles are not located on the same plane. The polymer 1 which constitutes the core is forced out through the opening 3 of the inner nozzle into the polymer 2 of the sheath.

The polymer forced out through the outer nozzle will flow while maintaining the configuration given at the time it was forced out through the opening of the inner nozzle (in other words, the shape of the cross-section of the inner nozzle) when the currents of both polymers are in the form of substantially uniform laminar flow. Therefore, the resultant configuration of the cross-section of the core in a two-component filament will carry essentially the configuration of the cross-section of the inner nozzle, and in general, it will represent the configuration of the inner nozzle on a smaller scale.

For the purpose of regularizing the flow-lines of the polymers within the respective nozzles and in order to preserve correct configuration of the polymer of the core, the present invention contemplates arranging the radii of both nozzles in such fashion that the ratio of these radii $R_2/R_1$ may be over 0.25. In order to obtain the steady-flow of the polymers, it is necessary to select an adequate temperature and a pressure which are suitable for the matching of the flows of the polymers within the nozzles. Care has to be taken especially when the pressure of the polymer for the sheath is higher than for the core, since such higher pressure on the part of the polymer for the core will cause undesirable turbulence of the current in the vicinity of the outer nozzle. However, the spinneret of the present invention where the aforementioned ratio of radii is prescribed to exceed 0.25 will minimize such turbulence of the flow of the polymers within the nozzles, and therefore, two-component filament is spun with a precise configuration designed for the core.

The cross-section of the opening of an outer nozzle may be of a circular configuration as shown in FIG. 17 and FIG. 18, or may take other shapes such as those illustrated in FIG. 19. As will be obvious, when the cross-section of the opening of the outer nozzle is not of a round shape, the circumference of the obtained filament will not be round either. As is obvious from the foregoing description, the spinneret of the present invention is one which is suitable for the manufacture of the two-component filaments as have been described. It is to be noted, however, that the filament of the present invention is not restricted to one manufactured with the spinneret of the present invention alone. It should be obvious that the said two-component filaments of the present invention can be obtained by a spinneret of a type other than that of the present invention.

EXAMPLE 1

Figure 9:
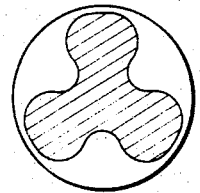

Polyethylene terephthalate was used for the core and nylon 66 for the sheath component. Those two-components were simultaneously extruded through same orifices with the exhaust ratio of gear pumps being set at 6:4, to form unitary filaments with a fineness of 73.9 deniers having such cross-sectional configuration as shown in FIG. 9. The filaments thus obtained then draw to a length 4.5 times the original length at 90° C., and thereafter the drawn filaments were annealed with hot water at 100° C. for 10 minutes while their length were kept constant; two-component filaments of 18.3 deniers were obtained. The filaments showed a dyeability identical with that of nylon 66 filament, but showed an increased stiffness in handling. However, a concentric circular two-component filament obtained by a process identical to that used in the above example did not show much difference in nature from the nylon 66. More specifically, polyethylene terephthalate fibers showed a modulus of elasticity in the range 40–90 g./d., which was about three times as stiff as nylon 6 and nylon 66 fibers. These latter fibers showed a modulus of elasticity in the range 10–30 g./d. However, when the polyethylene terephthalate was used for the core in a concentric two-component filament with the sheath made of nylon, the amount of its contribution to the flexural rigidtiy of the filament was noted to be negligible.

EXAMPLE 2

Figure 10:
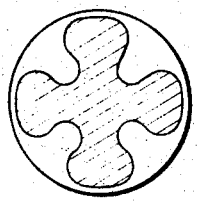
Figure 11:
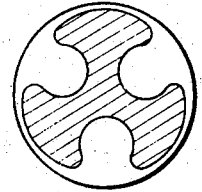

Polyethylene terephthalate was used for the core and nylon 6 was used for the sheath. Those two polymers were simultaneously extruded through same orifices with the exhaust ratio of gear pumps being set at 6:4, filaments with a cross-sectional configuration as shown in FIG. 10 were obtained. The ratio of moment of inertia of the cross-sectional shape of the core as compased to an equal circle was approximately 2.2. The filaments were drawn to a length 4.5 times as long as the original one at 80° C. Then they were annealed in hot water at 100° C. for 10 minutes while their length were kept constant, and thus drawn two-component filaments of 14.5 deniers were obtained. They are referred to as Specimen A. Concentric circular two-component filaments of 14.8 deniers were obtained under the same conditions. They are referred to as Specimen B. Nylon 6 filament of 14.7 deniers available in the market is referred to as Specimen C. Polyethylene terephthalate filament of 15.0 deniers is referred to as Specimen D. Each specimen was cut into a piece of 5 cm. in length, and was thoroughly opened and was made into a staple mass. Two grams of each specimen was placed separately into respective measuring cylinders with a diameter of 6 cm. A piston weighing 20 grams was placed upon said specimens. Small vibration was applied to the piston. When the piston showed a position of equilibrium, the graduation at which the piston was positioned was read. The volume of the specimen read at this time is referred to as V1. Then, a weight of 60 grams was added to the said piston. The volume after the piston was again balanced is referred to as V2. Since the volume of the staple mass under a load of weight increases in proportion to the magnitude of the flexural rigidity of the filament, V1 and V2 indicate the degrees of the flexural rigidity of the specimen. The result thus obtained is shown below:

| Specimen | V1, cc. | V2, cc. |
| --- | --- | --- |
| A (the filament of the present invention) | 211 | 107 |
| B (concentric filament) | 175 | 89 |
| C (nylon 6) | 170 | 73 |
| D (polyester) | 273 | 145 |

EXAMPLE 3

85 parts of undecamethylene diammonium terephthalate and 15 parts of e-caprolactam were polymerized at 290° C. for 5 hours in nitrogen gas stream, and a copolymer having a melting point of 260° C. was obtained. This copolymer was spun into a filament and the filament was drawn at 70° C. to a length 4.6 times as long as the original length. Thus a filament having a modulus of elasticity of 45 g./d. and which is hard to be dyed by the normal dyeing process of nylon 6 was obtained.

Figure 12:
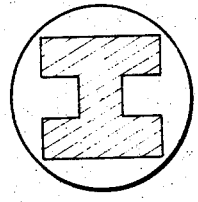

This copolymer was used for the core and nylon 6 was used for the sheath. Those polymers were simultaneously melt-spun through orifice under conjugating ratio of 1:1 by volume, a filament with such cross-sectional configuration as shown in FIG. 12 (the ratio of the moment of inertia of the cross-section of the core component relative to an equal circle was about 1,7) was obtained. The filament thus obtained was drawn 4.5 times its original length at 70° C., and after being annealed at 100° C. with hot water for 10 minutes while its length was kept constant, drawn filament of 15.1 deniers was obtained. This is referred to as Specimen E. Under the same conditions, a circular concentric two-component filament of 16.7 deniers was obtained. This is referred to as Specimen F. By the same method as used in the Example 2, the volumes of these specimens under loaded condition were obtained as follows:

| Specimen | V1, cc. | V2, cc. |
| --- | --- | --- |
| E | 192 | 97 |
| F | 168 | 80 |

EXAMPLE 4

Figure 20:
Figure 21:
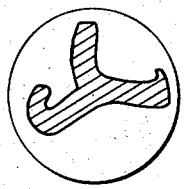

The copolymer described in Example 3 was used for the core and nylon 6 was used for the sheath. Those polymers were simultaneously melt-spun through an orifice under the conjugating ratio of 1:2 by volume to form unitary filaments as shown in FIGS. 20 and 21. FIG. 20 shows a filament in which two components are arranged in concentric sheath-core relationship, while FIG. 21 shows a filament conjugated eccentrically. These filaments were drawn at 80° C. to a length of 4.5 times their extruded length, and thus a drawn yarn was obtained respectively. The eccentrically arranged yarn developed helical three-dimensional crimps after drawing, and furthermore, when treated with hot water at 100° C. for 15 minutes under a relaxed condition, finer crimps were developed in the yarn. On the other hand, the drawn concentric yarn did not develop any appreciable curling by similar treatment in hot water at 100° C. Volumes under load of these two filaments were obtained by the same process as was used in Example 2, and it was noted that, as shown in the following table, the eccentrically arranged yarn showed a volume smaller than that of the concentric yarn under a small load, and a volume greater than that of the concentric yarn under a great load. This is considered to be understood by the explanation that the effect of the crimps and the effect of the method of the present invention acted in multiple fashion with the result that the modulus of elasticity with respect to the volume was enhanced.

| Specimen | V1, cc. | V2, cc. |
| --- | --- | --- |
| Concentric | 204 | 97 |
| Eccentric | 143 | 103 |

EXAMPLE 5

Figure 22:
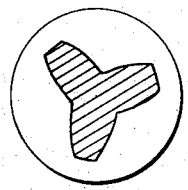

FIG. 20 and FIG. 21 are drawings taken from microscopic photographs showing the cross-sections of the filaments manufactured by the use of the spinneret of the present invention. In FIG. 20, the opening of the inner nozzle is formed by the slits with Y-shaped cross-section constituting the protruding arms ($R_1$) having a length of 1 mm., and a width of 0.2 mm. The outer nozzle is formed by a complementary-shaped opening with a radius ($R_2$) of 0.5 mm. FIG. 22 is an enlarged cross-sectional view of a filament obtained by the use of the spinneret identical with those in FIG. 20 but under a slightly higher pressure within the nozzles. Slightly distorted shapes of the inner component is observed. In FIG. 21, the Y-shaped slits with the length of the arms being 1.5 mm. and the width being 0.3 mm. were employed as the inner nozzles and circular openings with radius of 0.5 mm. as the outer nozzles. When the radius of the opening of the outer nozzle is smaller than the radius of the opening of the inner nozzle, the configuration of the cross-section of the inner component tends to be distorted. Furthermore, when the ratio between the radii was under 25%, the configuration of the inner component was constricted into a shape with reduced irregularities.

What is claimed is:

1. A drawn composite filament with improved flexural rigidity and high dyeability comprising two different components of synthetic fiber-forming high polymer which are conjointly melt-spun and arranged in a sheath-core relationship across the filament, the sheath component having higher dyeability than the core component, the core component having a modulus of elasticity higher than the sheath component and having a non-circular cross-sectional configuration, said configuration having a moment of inertia about the axes of respective axis systems one of which systems is constituted of two mutually perpendicular axes which pass through the center of gravity of said configuration while the other system is constituted of three axes which pass through the center of gravity of said configuration and are separated by 120°, said configuration when compared to a circular cross-section of the same area, having a moment of inertia about any axis of either system which is at least 0.8 times the moment of inertia about an axis of the circular cross-section, said configuration having an arithmetic means of the moments of inertia for either system which is at least 1.2 times that of the corresponding axis system of the circular cross-section.

2. A filament as claimed in claim 1 wherein said components are in concentric relation.

3. A filament as claimed in claim 1 wherein said components are in eccentric relation.

4. A filament as claimed in claim 1 wherein said sheath element has a circular outline.

5. A filament as claimed in claim 1 wherein said sheath element has an outline corresponding in approximate shape to that of the core element.

6. A filament as claimed in claim 1 wherein said composite filament has a center of gravity which is offset from the center of gravity of the core alone.

7. A composite filament with improved flexural rigidity and good dyeability comprising a unitary core and a sheath conjointly melt-spun of different fiber-forming high polymers and conjointly drawn, said core having a modulus of elasticity greater than that of said sheath and said sheath having better dyeing characteristics than said core, said core having a basically symmetrical non-circular cross sectional shape having moments of inertia about the axes of two systems, one of which consists of two mutually perpendicular axes passing through the center of gravity of said cross sectional shape and the other consists of three axes extending radially from said center of gravity and 120° apart, the arithmetic mean of which moments is at least 1.2 times the moment of inertia of a circular cross section of the same area and the minimum value of which about any axis of either said system is at least 0.8 times the moment of inertia of said circular cross section, the center of gravity of said sheath being essentially coincident with the center of gravity of said core and the circumference of said sheath closely circumscribing said core, said sheath covering all portions of said core with substantially equal thickness of said sheath at circumferentially distributed portions of said core, whereby said core imparts flexural rigidity to said filament and said sheath provides good dyeability.

References Cited
UNITED STATES PATENTS

| | | | |
|---|---|---|---|
| 1,267,025 | 5/1918 | Weinheim | 28—75 |
| 2,939,201 | 6/1960 | Holland | 161—177 |
| 2,987,797 | 6/1961 | Breen | 161—175 |
| 2,939,202 | 6/1959 | Holland | 161—177 |
| 2,936,482 | 6/1955 | Kilian | 18—8 |

ROBERT F. BURNETT, Primary Examiner

R. O. LINKER, JR., Assistant Examiner

U.S. Cl. X.R.
161—177; 264—177